United States Patent
Boyer et al.

(10) Patent No.: US 6,378,513 B1
(45) Date of Patent: Apr. 30, 2002

(54) MULTICHARGE IGNITION SYSTEM HAVING SECONDARY CURRENT FEEDBACK TO TRIGGER START OF RECHARGE EVENT

(75) Inventors: John W. Boyer, Westfield; Raymond O. Butler, Jr., Anderson; Daniel J. O'Connor, Westfield, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/637,089

(22) Filed: Aug. 10, 2000

Related U.S. Application Data

(63) Continuation-in-part of application No. 09/359,185, filed on Jul. 22, 1999, now Pat. No. 6,186,130.

(51) Int. Cl.[7] ................ F02P 3/05; F02P 5/15
(52) U.S. Cl. ............ 123/625; 123/637; 123/644
(58) Field of Search ................. 123/609, 620, 123/625, 644, 637

(56) References Cited

U.S. PATENT DOCUMENTS

| | | | |
|---|---|---|---|
| 5,014,676 A | 5/1991 | Boyer ................ 123/637 |
| 5,462,036 A | 10/1995 | Kugler et al. ............ 123/609 |
| 5,758,629 A | * 6/1998 | Bahr et al. ............... 123/644 |
| 5,866,808 A | 2/1999 | Ooyabu et al. ........... 73/116 |
| 6,138,653 A | * 10/2000 | Juffinger ............ 123/644 X |
| 6,186,130 B1 | * 2/2001 | Skinner et al. ....... 123/644 X |

* cited by examiner

Primary Examiner—Tony M. Argenbright
(74) Attorney, Agent, or Firm—Margaret A. Dobrowitsky

(57) ABSTRACT

An ignition system for an internal combustion engine includes an ignition coil coupled to a spark plug in a combustion chamber of the engine, and a switch responsive to an ignition control signal for causing a primary current to flow through a primary winding (16) of the ignition coil. A control circuit is configured to generate the ignition control signal so as to produce a plurality of sparks at the spark plug during a combustion event in the cylinder. A secondary current trip circuit in sensing relation to the secondary winding is configured to generate secondary current trip signal when the secondary current decays down past a secondary current trip threshold. The control circuit is further configured to trigger a recharge event of the multicharge operation in response to the secondary current trip signal, thereby minimizing variability in terms of the amount of energy delivered to the combustion chamber.

12 Claims, 3 Drawing Sheets

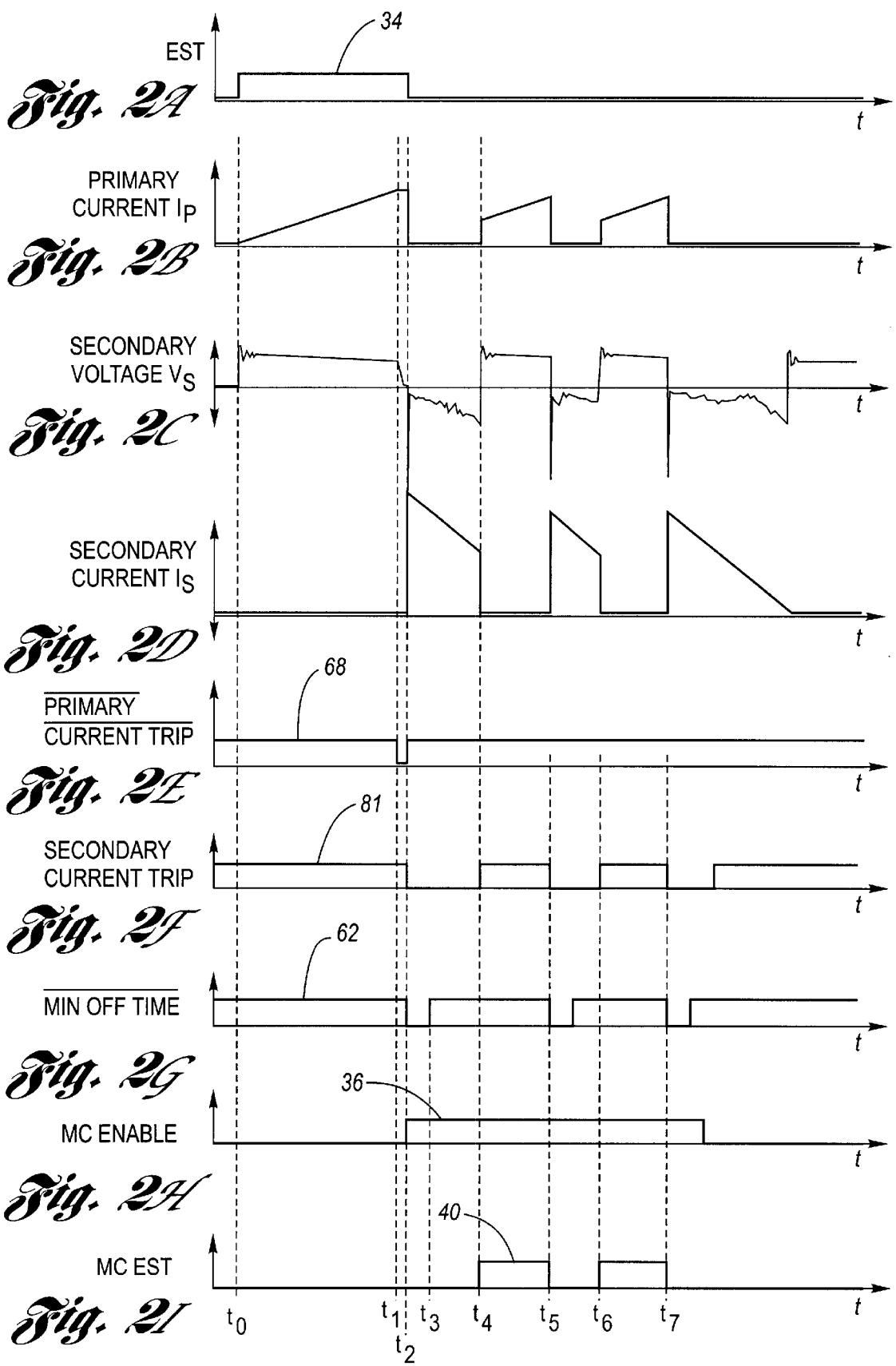

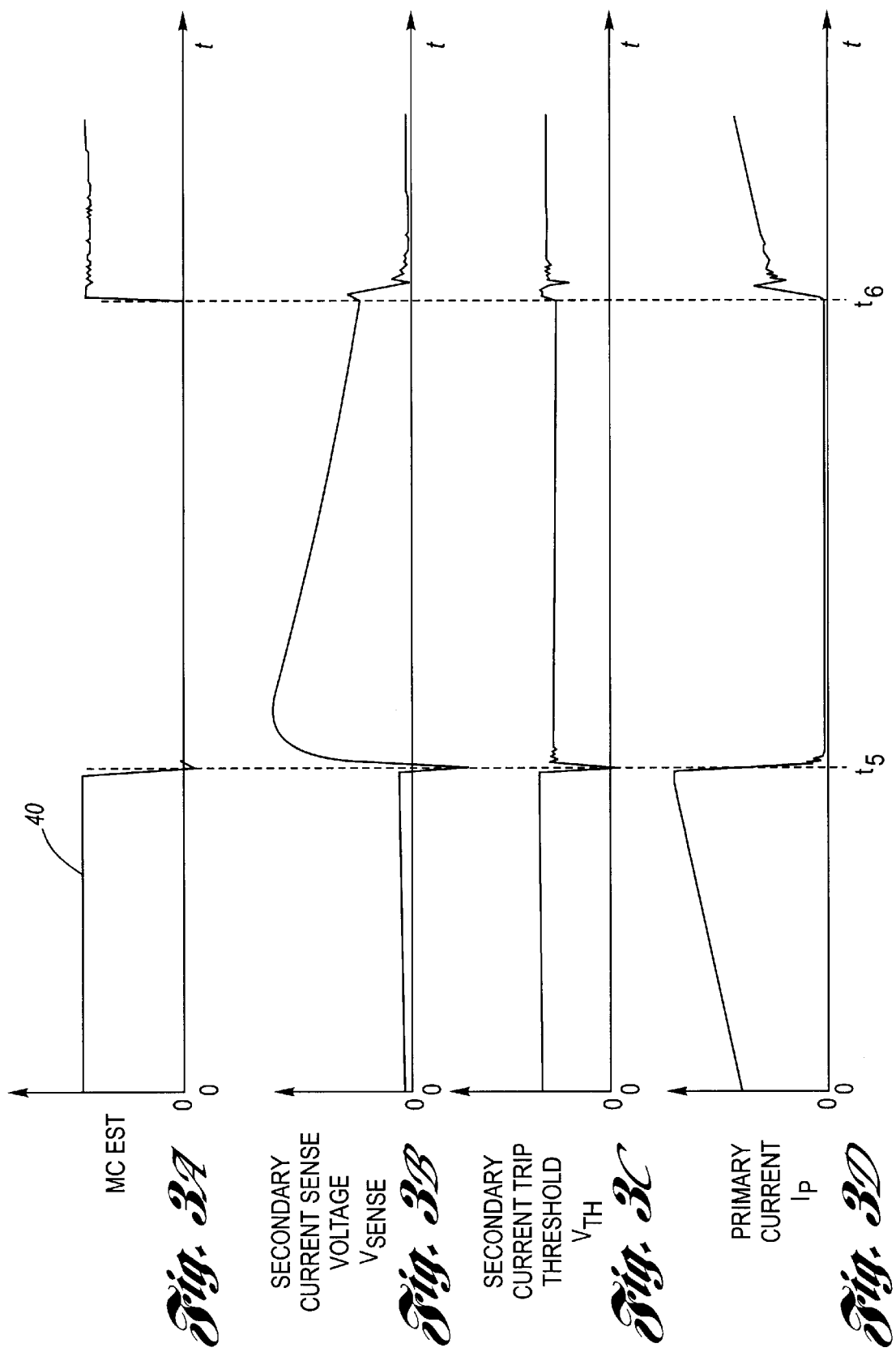

US 6,378,513 B1

MULTICHARGE IGNITION SYSTEM HAVING SECONDARY CURRENT FEEDBACK TO TRIGGER START OF RECHARGE EVENT

RELATED APPLICATIONS

This Application is a continuation-in-part of co-pending U.S. application Ser. No. 09/359,185, filed Jul. 22, 1999, now U.S. Pat. No. 6,186,130 which is incorporated herein by reference in its entirety.

BACKGROUND OF THE INVENTION

1. Field of the Invention

The present invention relates generally to a system for controlling ignition in an internal combustion engine, and more particularly, to a system configured to produce repetitive spark for ignition having secondary current feedback to trigger start of a recharge event.

2. Description of the Related Art

There has been much investigation in the ignition art directed to systems for generating multiple spark events during combustion. Such systems are sometimes referred to as "multicharge" systems. Such ignition systems provide a succession of spark breakdowns to ensure ignition of a combustible air/fuel mixture introduced into a cylinder of an internal combustion engine, as seen by reference to U.S. Pat. No. 5,014,676 issued to Boyer. Boyer discloses a system configured to provide a series of sparks to increase the number of ignition events and hence the probability of combustion of the air/fuel mixture by extending the time and total energy available for combustion. Boyer discloses an ignition coil that undergoes an initial charge (i.e., initial dwell) wherein a primary current is established in a primary winding of the ignition coil. The initial dwell is immediately followed by an initial discharge of the ignition coil wherein a secondary current in a secondary winding thereof discharges through a spark plug to generate a first spark. Subsequent recharge intervals (i.e., subsequent dwell periods) follow, accompanied by respective discharge intervals (i.e., spark events). The number of sparks produced is generally determined by a predetermined operating strategy (e.g., a fixed number of sparks, or, the greatest number of sparks that can be initiated before the end of a predetermined angle of engine rotation). In addition, the period of time in conventional systems allowed for the discharge of the coil (i.e., spark event) and burn before the next recharge is determined solely based on time. However, prior approaches such as the system disclosed in Boyer have shortcomings.

One shortcoming involves the great variability in the amount of energy pulled from the coil and delivered to the combustion chamber in a given amount of time (i.e., the discharge time in fixed-time discharge systems). Uneven energy delivery may adversely affect consistency in ignition.

There is therefore a need to provide an ignition control system for producing repetitive spark in a combustion chamber of an internal combustion engine that minimizes or eliminates one or more of the shortcomings as set forth above.

SUMMARY OF THE INVENTION

An ignition system in accordance with the present invention is characterized by the features specified in claim 1.

One object of the present invention is to provide an ignition system suitable for use in generating repetitive spark that minimizes or eliminates the variability in the amount of energy delivered to the combustion chamber.

These and other objects, advantages, and features of the present invention are realized by an ignition system in accordance with the present invention. One advantage of the present invention is that the recharge interval portion of multicharge operation (i.e., repetitive spark during the firing of one cylinder) is triggered when a predetermined amount of energy has been delivered to the chamber, as determined by a secondary current sensing circuit. This improves consistency in ignition.

An ignition system in accordance with the present invention is configured for use with an internal combustion engine. The ignition system includes an ignition coil having a primary winding and a secondary winding that is coupled to a spark plug in a combustion chamber of the engine. The system further includes a switch responsive to an ignition control signal for causing a primary current to flow through the primary winding circuit. The system also includes a control circuit, which is configured to generate the ignition control signal so as to repetitively interrupt the primary current, creating pulses of secondary current to produce a plurality of sparks at the spark plug. The ignition system further includes a sensing circuit in sensing relation with the secondary winding configured to generate a secondary current signal representative of a level of secondary current in the secondary winding. Advantageously, the control circuit is further configured to generate the ignition control signal so as to reestablish the primary current in preparation of the next spark when the secondary current reaches (i.e., decays to) a secondary current threshold.

Other objects, features, and advantages of the present invention will become apparent to one skilled in the art from the following detailed description and accompanying drawings illustrating features of this invention by way of example, but not by way of limitation.

BRIEF DESCRIPTION OF THE DRAWINGS

FIGS. 2A–2I are simplified, timing diagram views illustrating various signals during operation of the embodiment of FIG. 1; and FIGS. 3A–3D are simplified, timing diagram views illustrating, in greater detail, a trigger of a recharge event based on a secondary current threshold.

DETAILED DESCRIPTION OF THE PREFERRED EMBODIMENTS

Figure 1:
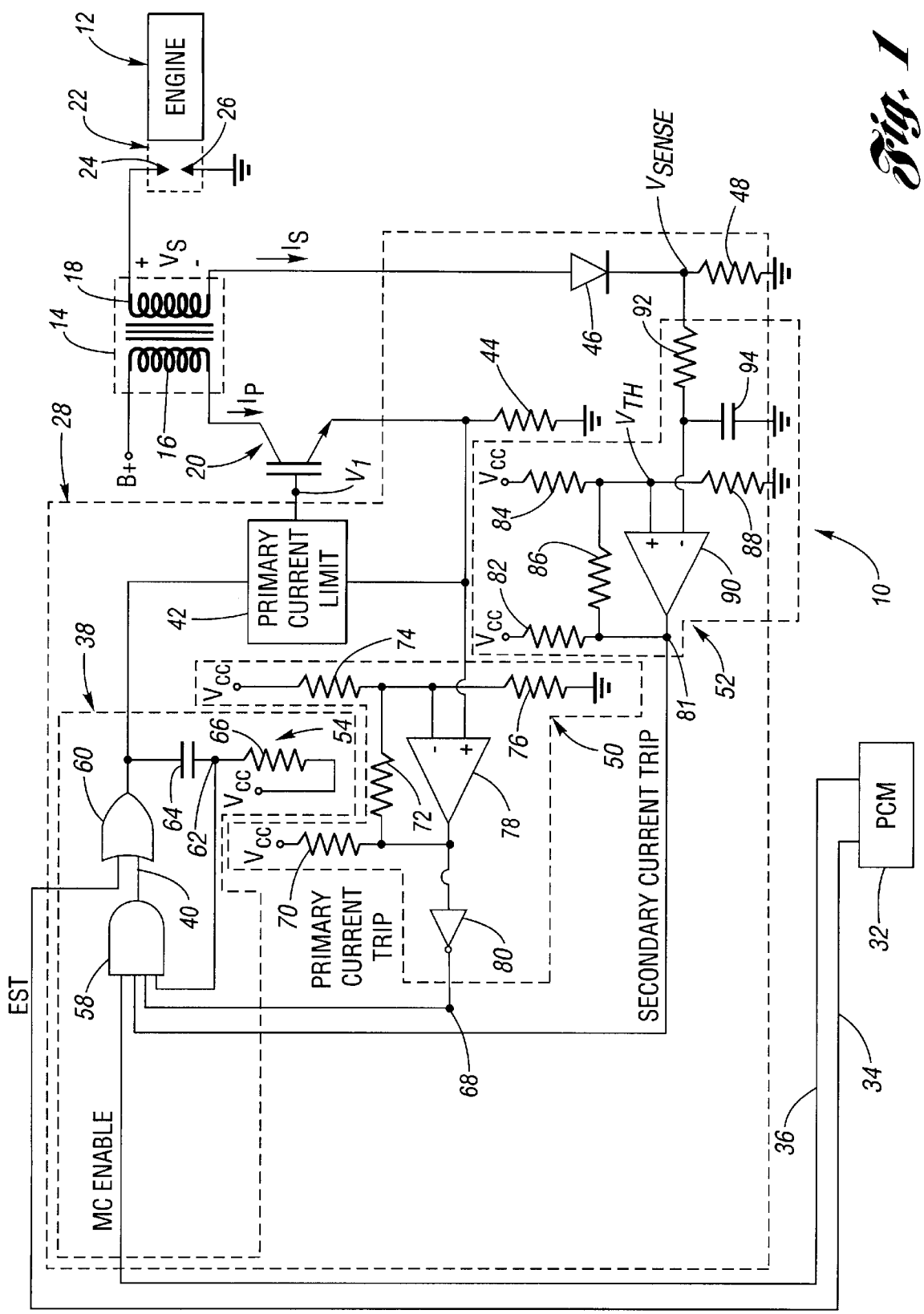
FIG. 1 is a simplified schematic and block diagram view of an ignition system in accordance with the present invention.

Referring now to the drawings wherein like reference numerals are used to identify identical components in the various views, FIG. 1 illustrates an ignition system 10 for controlling repetitive spark in an internal combustion engine 12. System 10 includes an ignition coil 14 comprising a primary winding 16 and a secondary winding 18, a switch 20, a spark plug 22 comprising a first electrode 24 and a second electrode 26, and a first control circuit 28. FIG. 1 further illustrates a second control circuit, such as a powertrain control module (PCM) 32.

Before proceeding to a detailed description of system 10 keyed to the drawings, a general overview of the control established by the present invention will be set forth. A key disadvantage of conventional multicharge systems involves the fixed time duration discharge interval before recharge. Applicants have found that this variability is due to variations in engine operating parameters (e.g., flow conditions)

and environmental factors related thereto. The present invention implements a multicharge ignition system having feedback from a secondary current sensing arrangement. This sensed current information, when it indicates that the secondary current has decayed to reach a secondary current threshold level, is used to trigger the recharge portion of the multicharge operation (i.e., generation of multiple sparks during the firing of a single cylinder). Triggering off of a predetermined secondary current threshold minimizes the variability in the amount of energy delivered to the combustion chamber.

With continued reference to FIG. 1, engine 12 may be of the type having a direct ignition system for initiating combustion. In the illustrated embodiment, one ignition coil is provided per plug 22.

Ignition coil 14 is configured to function as a selectively controllable step-up transformer. One end, such as the high side end, of primary winding 16 is connected to a supply voltage provided by a power supply, such as a vehicle battery (not shown), hereinafter designated "B+" in the drawings. Supply voltage B+ may nominally be approximately 12 volts. A second end of primary winding 16 opposite the high side end is connected to switch 20. A first end of secondary winding 18, namely the high side end, is coupled to spark plug 22. A second end of secondary winding 18 opposite the high side end, namely the low side end, is connected through circuitry to a ground node. Primary winding 16 and secondary winding 18 are matched in a predetermined manner known in the art.

Switch 20 is provided to selectively connect primary winding 16 to ground, in accordance with an ignition control signal, designated $V_1$, generated by first control circuit 28. Such connection via closure of switch 20, as is known generally in the art, will cause a primary current $I_p$ to flow through primary winding 16. Of course, when the ignition control signal $V_1$ is discontinued (deasserted), switch 20 is opened and the primary current $I_p$ is interrupted, thereby producing a spark. Switch 20 is illustrated in FIG. 1 as an insulated gate bipolar transistor (IGBT); however, it should be understood that such illustration is exemplary only and not limiting in nature. Switch 20 may comprise alternative conventional components known to those of ordinary skill in the art.

Coil 14 and switch 20 together define the means for selectively storing energy, preferably in a predetermined amount, and thereafter transferring the stored energy to spark plug 22.

Spark plug 22 is disposed in engine 12 proximate a cylinder thereof, and is configured to produce a spark across a gap defined by spaced electrodes 24, 26. The spark event, as is generally understood by those of ordinary skill in the art, is provided to ignite an air and fuel mixture introduced into the cylinder. During the spark event, a spark current (i.e., a secondary current $I_s$) flows across plug electrodes 24, 26. However, when switch 20 is closed to charge coil 14, a positive "make" voltage is generated across the secondary winding, and thus across the spark plug gap. The "make" voltage may be used to induce an ion current across the spark plug gap, as described and claimed in. copending application entitled "MAKE VOLTAGE BIAS ION SENSE MISFIRE DETECTION SYSTEM", application Ser. No. 09/328,747, filed Jun. 9, 1999, now U.S. Pat. No. 6,263,727, hereby incorporated by reference in its entirety. The magnitude of the ion current is indicative of a combustion condition, such as combustion, and/or misfire. The greater the ion current (i.e., due to more ionized molecules present in the cylinder arising from combustion), the more complete the combustion.

Control circuit 28 is configured to generate the ignition control signal $V_1$ to open and close switch 20 for alternately causing primary current $I_p$ to flow through primary winding 16, and to interrupt the primary current $I_p$ to produce a spark. Control circuit 28 also implements a multicharge ignition control strategy, controlling the generation of the ignition control signal $V_1$ so as to repetitively interrupt the primary current during a single combustion event, thereby producing a plurality of sparks at spark plug 22 in the cylinder of engine 12.

Control circuit 28 achieves these and other functions in response to a first electronic spark timing (EST) signal 34 and a multicharge enable (MC ENABLE) signal 36, both from PCM 32. PCM 32 is configured to generate the EST signal 34 and the MC ENABLE signal 36 according to a predetermined operating strategy, based on a plurality of engine operating parameter inputs, known to those of ordinary skill in the art. For example, in the illustrated embodiment, PCM 32 determines the initial charging time (e.g., duration of the EST signal), and the relative timing (e.g., relative to cylinder top dead center) of when the initial spark is to occur. In addition, PCM 32 also determines the nominal duration of multicharge operation (e.g., duration of the MC ENABLE signal), which may be selected to end based on a predetermined angular position of the piston relative to top dead center. PCM 32 may also determine when to enable multicharge at all.

In the illustrated embodiment, control circuit 28 includes a circuit 38 for generating a second EST signal (a multicharge EST signal—MC EST) 40, a primary current limiting circuit 42, a primary current sense element 44, a diode 46, a secondary current sense element 48, a primary current trip circuit 50 and a secondary current trip circuit 52.

Circuit 38 provides the means for outputting the ignition control signal by combining the EST signal 34 and the MC EST signal 40 in timed relation to each other during the multicharge interval. The multicharge interval corresponds to the duration of the MC ENABLE signal 36. Circuit 38, in an illustrated embodiment, may include a minimum "OFF" time circuit 54, a four-input logical AND gate 58, and a two-input logical OR gate 60. Minimum "OFF" time circuit 54 generates a signal on a common node 62, and comprises a capacitor 64, and a resistor 66.

With continued reference to FIG. 1, AND gate 58 receives four input signals. The first input signal is the MC ENABLE signal 36. The MC ENABLE signal will be high when multicharge is desired, and will go low when PCM 32 determines that multicharge operation should end. The logic low MC ENABLE is operative to terminate multicharge operation by forcing the output of AND gate 58 low, which in-turn results in the output of OR gate 60 going low. The second and third input signals to AND gate 58 are from the primary current trip circuit 50 and secondary current trip circuit 52, respectively. These input signals control the recharge and discharge (spark) interval durations during multicharge operation. The fourth input signal to AND gate 58 is a feedback signal used to define a minimum "OFF" time of switch 20 during multicharge operation. How each of the four inputs is generated will be described below in detail. Based on the four inputs, the AND gate 58 generates the MC EST signal 40. The two-input OR gate 60 receives the EST signal 34, and the MC EST signal 40. The output of OR gate 60 is provided to control switch 20, by way of a primary current limit circuit 42.

A description of how each of the four inputs to AND gate 58 are generated will now be set forth, in-turn. As to the above-mentioned first input, as described above, PCM 32 controls when the MC ENABLE signal goes high and low. When MC ENABLE is low, gate 58 follows and also goes low. When MC ENABLE is high, the output of gate 58 depends on its other inputs.

The second and third input signals to AND gate 58 referred to above are generated by circuits 50, 52. Primary current trip circuit 50 is used during multicharge operation to determine the duration that coil 14 is charged (or "recharged"). Circuit 50 may include resistors 70, 72, 74, 76, a comparator 78 and an inverter 80. Circuit 50 generates a primary current trip signal 68 at the output of gate 80, which is provided to AND gate 58. Circuit 50 is configured generally to output the primary current trip signal 68 in a high state while the level of the primary winding current $I_p$ is less than a predetermined reference level. However, when the level of the primary current, as indicated by the voltage across resistor 44, exceeds a predetermined level (e.g., 10 amps), then the output of comparator 78 changes state (at least momentarily), thereby changing the primary current trip signal 68 from a logic high to a logic low. This high-to-low change in state has the effect of disabling or discontinuing the MC EST signal 40. It should be appreciated by those of ordinary skill in the art that the network of resistors 70, 72, 74 and 76 establishes the reference voltage that is applied to the inverting input of comparator 78, and against which the voltage across resistor 44 is compared. Resistor 72 also provides the required feedback from output to input of comparator 78. Elements 70–80 may comprise conventional components known to those of ordinary skill in the art.

Circuit 52 in cooperation with a secondary current sense arrangement generates a secondary current trip signal 81. The secondary current sense arrangement includes a diode 46 and sense element 48. Diode 46 is configured to direct a secondary current $I_s$ (i.e., spark current) that flows through spark plug 22 and secondary winding 18 through a path to ground. Diode 46 prevents current from flowing from ground through sense element 48 when a make voltage bias is applied to spark plug 22 as a result of closing switch 20. The voltage developed across sense resistor 48 is proportional to the level of secondary winding current. This voltage is provided to secondary current trip circuit 52.

Secondary current trip circuit 52 is used during multicharge operation to determine the duration that coil 14 discharges. Circuit 52 may include resistors 82, 84, 86, 88, a comparator 90, a resistor 92 and a capacitor 94. Circuit 52 is configured to output the secondary current trip signal 81 in a logic low state at the output of comparator 90 so long as the level of the secondary current exceeds a predetermined threshold level. When the secondary current through secondary winding 18, as indicated by the voltage across resistor 48, decays to the predetermined threshold, then the output of comparator 90 changes state from a logic low to a logic high, which is provided to AND gate 58. The low-to-high change of state has the effect of enabling the MC EST signal 40 for further multicharge operation. When there is no secondary current (i.e., no spark current), circuit 52 outputs a logic high as well. Resistors 82, 84, 86, and 88 are configured to both establish a reference threshold voltage $V_{TH}$ that is applied to the non-inverting input of comparator 90, as well as provide the necessary feedback for the configuration illustrated in FIG. 1. Resistor 92 and capacitor 94 from an input filter network to filter out spurious noise arising from switching events, and the spark event. Elements 82–94 may comprise conventional components known to those of ordinary skill in the art.

The above-described fourth input to AND gate 58 is produced by circuit 54. Minimum "OFF" time circuit 54 ensures a minimum "OFF" or coil discharge interval during multicharge operation. Circuit 54 receives the output of OR gate 60 as an input, and generates an "OFF" time signal as an output, which is fed directly to AND gate 58. Assume that capacitor 64 is initially discharged during the assertion of electronic spark timing (EST) signal 34, due to a logic high voltage on both sides of capacitor 64. The voltage at node 62 common to capacitor 64 and resistor 66 is therefore substantially at a logic high voltage level. This logic high is provided to AND gate 58.

When the output of OR gate 60 goes low (i.e., command for switch 20 to turn "OFF"), the voltage level on node 62 initially goes to ground. Thereafter, however, the voltage level increases with time in accordance with exponential relationships defined by the capacitance and resistance values of capacitor 64 and resistor 66, respectively. The logic low at common node 62 is fed to AND gate 58, maintaining the AND gate 58 output in a low logic state, keeping switch 20 "OFF". After a predetermined, minimum "OFF" time, the voltage at common node 62 will increase to such a level so as to operate as a logic high, which is provided to AND gate 58. At this point, the output of AND gate 58 will depend on its other input signals, particularly the input from secondary current trip circuit 52. Minimum "OFF" time circuit 54 ensures that switch 20 is maintained off for a set time before recharging of the coil 14 is commenced. For example, a short at spark plug 22, or a carbon fouled plug, may cause very quick discharge of coil 14. Circuit 54 prevents high frequency recharging/discharging, which is generally undesirable, by maintaining a minimum "OFF" time.

Control circuit 28 also includes primary current limiting circuit 42. Circuit 42 is configured to alter the ignition control signal $V_1$ when a primary current limit has been reached as determined by sense element 44. In the illustrated embodiment, primary current sense element 44 comprises a resistor having a predetermined resistance value. The voltage developed across resistor 44 varies as a function of the level of primary current flowing therethrough. The ignition control signal $V_1$ is altered so as to hold or maintain the primary current substantially at the primary current limit (e.g., 8A, 10A, etc.). In one embodiment, the altering step involves lowering the voltage of signal $V_1$ that is applied to switch 20. Primary current limiting circuit 42 may therefore comprise circuitry known to those of ordinary skill in the art configured to compare the sensed voltage with a reference voltage and, in response thereto, to reduce or lower the ignition control signal $V_1$ that is destined for the gate of switch 20.

It should be understood that when the output of OR gate 60 is in a logic high state, switch 20 is "closed", thus allowing a primary current to flow and increase. Additionally, when the output of OR gate 60 is in a logic low state, switch 20 is "open", thus, interrupting the primary current $I_p$. Elements 54, 56, 58, 60, 64 and 66 may comprise conventional components well known to those of ordinary skill in the art.

Referring now to FIGS. 2A–2I, the operation of an embodiment according to the present invention will now be set forth. PCM 32, in accordance with a predetermined operating strategy, determines when to assert the electronic spark timing signal EST 34. This signal is shown in FIG. 2A, initially asserted at time $t_0$. The asserted EST signal 34 is the command to commence charging of ignition coil 14 for a first spark event. Circuit 38 of control circuit 28, in response thereto, adjusts the ignition control signal on node $V_1$, which causes switch 20 to conduct, wherein a primary current $I_p$ flows through primary winding 16. The primary current $I_p$ is shown in FIG. 2B. During the charging of ignition coil 14, a positive "make" voltage $V_s$ is generated across the spark gap, which is shown in FIG. 2C. Inasmuch as this is the initial charging of ignition coil 14 in preparation of a first spark event, combustion has not yet occurred. The secondary current $I_s$ through secondary winding 18 between times $t_0$ and $t_1$ is substantially zero, as shown in FIG. 2D. The primary current trip signal 68 is initially in a logic high state after time $t_o$, which is shown in FIG. 2E. Since the secondary current $I_s$ is substantially zero initially after $t_o$, the secondary current trip signal 81 is a logic high, as shown in FIG. 2F initially after time $t_0$. The minimum "OFF" time signal is also a logic high between times $t_0$ and $t_1$, as shown in FIG. 2G.

The EST signal 34 is applied, in the illustrated embodiment, as a positive going pulse having a duration corresponding to an initial ignition coil charge ("dwell") time. As described above, charging commences at the time of receipt by control circuit 28 of a rising (positive going) edge of the EST signal 34. The primary current $I_p$ builds up until it reaches a predetermined threshold, which occurs at time $t_1$. Primary current limit circuit 42 operates to hold the primary current $I_p$ at this maximum, threshold level (FIG. 2B) beginning at time $t_1$. Also, since the primary current threshold has been reached, the primary current trip signal is generated at time $t_1$ (FIG. 2E)

Upon receipt of a falling (negative going) edge of the EST signal 34, circuit 38 causes switch 20 to open, thereby causing an interruption in the primary current $I_p$ at time $t_2$. It is well understood by those of ordinary skill in the art of ignition control that such interruption results in a relatively high voltage $V_s$ being immediately established across secondary winding 18, due to the collapsing magnetic fields associated with the interruption of the primary current. This voltage is shown in FIG. 2C as a large, negative "spike" at time $t_2$. The secondary voltage will continue to rise until reaching a break down voltage across electrodes 24, 26 of spark plug 22. Current will thereafter discharge across the gap, as is generally understood in the art. This current $I_s$ is shown in FIG. 2D. The spark current flows from ground across spark plug electrodes 24, 26, through secondary winding 18, and thereafter through forward-biased diode 46, through resistor 48 and back to ground. The secondary, "spark" current has a maximum value (absolute) at time $t_2$, and thereafter decreases, in an absolute value sense.

As also illustrated, PCM 32 asserts the MC ENABLE signal 36 at time $t_2$, the time when the EST signal is deasserted, indicating that multicharge operation is desired. This signal will enable circuit 38. Additionally, since the secondary current $I_s$ at time $t_2$ is greater than the secondary current threshold, the secondary current trip signal 81 will go low. This low logic signal will keep switch 20 off, via AND gate 58 and OR gate 60. Also note that the minimum "OFF" time circuit will keep switch 20 "OFF" in any event, at least until time $t_3$. The secondary current will then decay after time $t_2$.

When the secondary current $I_s$ decays down to a preselected level, the secondary trip signal 81 will transition low-to-high, as shown at time $t_4$ (a "trigger"), thereby turning switch 20 back on via AND gate 58 and OR gate 60. The output of AND gate 58 defines the MC EST signal 40, which also goes high at time $t_4$. The MC EST signal 40 defines a command to cause switch 20 to reconnect primary winding 16 to ground, ostensibly to recharge ignition coil 14 by causing the primary current $I_p$ to resume flowing through primary winding 16. During the recharge interval, which lasts only so long as the primary current level is less than the primary current trip level, the make voltage is again established across secondary winding 18.

As shown in FIG. 2C, primary current $I_p$ is again interrupted at times $t_5$ and $t_7$ to produce respective second and third sparks.

FIGS. 3A–3D show the foregoing-described secondary current "trigger" for recharge in greater detail. FIG. 3A shows the MC EST signal 40 going low at time $t_5$ to generate a second spark. FIG. 3B shows the secondary current sense voltage $V_{SENSE}$, which is provided to secondary current trip circuit 52 via input resistor 92. The level of this signal $V_{sense}$ corresponds to the level of secondary current in secondary winding 18. A secondary current trip threshold $V_{TH}$, which is applied to the non-inverting input terminal of comparator 90, is shown in FIG. 3C. The voltage $V_{th}$ corresponds to a secondary current level threshold $I_{s\text{-}th}$ through winding 18. FIGS. 3B and 3C are similarly scaled; accordingly, when the trace in FIG. 3B ($I_s$) decays down so that it is below the level of the trace in FIG. 3C ($V_{TH}$), then the secondary current trip signal 81 will go high ("trigger"). Since the other inputs to AND gate 58 are also high at this time, this "trigger" event at time $t_6$ is operative to cause AND gate 58 to also go high. This transition will cause OR gate 60 to go high, turning switch 20 "ON". This action will reestablish primary current $I_p$ through primary winding 16. This reestablishment of current is shown in FIG. 3D.

A system in accordance with the present invention provides accurate and reliable implementation of a repetitive spark system having a reduced variability in terms of the amount of energy delivered to a combustion chamber during each spark event. The inventive system accomplishes the foregoing by triggering a recharge event when a secondary current trip detection circuit determines that a secondary current has decayed to a predetermined level. In one constructed embodiment, where a maximum primary current $I_{pmax}$ was 10 amperes, a secondary current trip threshold was selected so that when recharge was recommenced, the primary current started up at about 5 amperes (i.e., 50% of the maximum). Of course, other levels may be selected to achieve alternate performance goals.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

We claim:

1. A method of controlling ignition in an internal combustion engine comprising the steps of:
   (A) determining a secondary current threshold;
   (B) charging an ignition coil by establishing a primary current through a primary winding of the coil;
   (C) producing a first spark by interrupting the primary current to thereby generate a secondary current in a secondary winding of the coil;
   (D) determining a level of the secondary current;
   (E) recharging the ignition coil by reestablishing the primary current when the secondary current level reaches the secondary current threshold wherein the secondary current threshold is further determined as a function of an amount of energy remaining in the coil.

2. The method of claim 1 further comprising the step of: producing a second spark by interrupting the primary current.

3. An ignition system for an internal combustion engine including a control circuit configured to generate an ignition control signal, an ignition coil having a primary winding and a secondary winding, said primary winding including a first end coupled to a power supply, a switch connected to a second end of said primary and configured to selectively cause a primary current to flow through said primary winding in response to said ignition control signal, said control circuit being configured to cause said switch to interrupt said primary current wherein a secondary current is established in said secondary winding configured to cause a spark plug coupled to said secondary winding to produce a first spark, characterized by:

a sensing circuit in sensing relation with said secondary winding configured to generate a secondary current signal representative of a level of secondary current in said secondary winding; and said control circuit being responsive to said secondary current signal and configured to generate said ignition control signal so as to reestablish said primary current in preparation of a second spark during a combustion event when said secondary current reaches a secondary current threshold that is determined as a function of an amount of energy remaining in the coil.

4. The system of claim 3 wherein said sensing circuit comprises a resistor.

5. The system of claim 3 wherein said control circuit includes a secondary current trip circuit responsive to said secondary current signal and configured to generate a secondary current trip signal indicating that said secondary current is less than said secondary current threshold.

6. The system of claim 5 wherein said secondary current trip circuit comprises a comparator responsive to said secondary current signal and a reference voltage corresponding to said secondary current threshold.

7. The system of claim 6 wherein said control circuit further includes a primary current trip circuit configured to generate a primary current trip signal when said primary current exceeds a primary current threshold.

8. The system of claim 7 wherein said primary current trip signal is active-low and said secondary current trip signal is active-high.

9. An ignition system for an internal combustion engine comprising:

a control circuit configured to generate an ignition control signal;

an ignition coil having a primary winding and a secondary winding, said primary winding including a first end coupled to a power supply;

a switch connected to a second end of said primary winding and configured to selectively cause a primary current to flow through said primary winding in response to said ignition control signal;

a secondary current sensing circuit in sensing relation with said secondary winding configured to generate a secondary current signal representative of a level of a secondary current in said secondary winding; and said control circuit being configured to cause said switch to interrupt said primary current to thereby establish said secondary current adapted to cause a spark plug coupled to said secondary winding to produce a first spark during a combustion event, said control circuit being further configured to generate said ignition control signal so as to reestablish said primary current in preparation of a second spark during said combustion event when said secondary current reaches a secondary current threshold, wherein the secondary current threshold is further determined as a function of an amount of energy remaining in the coil.

10. The system of claim 9 further including:

a primary current sensing circuit in sensing relation to said primary winding configured to generate a primary current signal representative of a level of said primary current.

11. The system of claim 10 wherein said control circuit includes:

a primary current trip circuit responsive to said primary current signal and configured to generate a primary current trip signal when said primary current exceeds a primary current threshold;

a secondary current trip circuit responsive to said secondary current signal and configured to generate a secondary current trip signal when said secondary current is less than said secondary current threshold.

12. The system of claim 11 wherein said control signal is further configured to alternatively recharge and discharge said ignition coil in response to said secondary current trip signal and said primary current trip signal, respectively.

* * * * *